United States Patent [19]

Perry et al.

[11] 4,066,033
[45] Jan. 3, 1978

[54] OVER INFLATION AND UNDER INFLATION INDICATOR FOR TIRES

[76] Inventors: Robert A. Perry, 777 Grape St., Riverside, Calif. 92507; Placido Martos, 12021 Holston Ave., La Mirada, Calif. 90638

[21] Appl. No.: 688,711

[22] Filed: May 21, 1976

[51] Int. Cl.² .......................................... B60C 23/04
[52] U.S. Cl. .................................. 116/34 R; 137/227
[58] Field of Search .................... 116/34 R, 34 B; 137/227, 229; 73/146.8

[56] References Cited

U.S. PATENT DOCUMENTS

| | | | |
|---|---|---|---|
| 1,417,168 | 5/1922 | Harris | 116/34 R |
| 2,794,343 | 6/1957 | Lagrange | 73/146.8 |
| 3,224,409 | 12/1965 | Fenger et al. | 116/70 |
| 3,738,308 | 6/1973 | Barabino | 137/227 |
| 3,739,637 | 6/1973 | Novak | 116/34 R |

Primary Examiner—Daniel M. Yasich
Attorney, Agent, or Firm—John H. Crowe

[57] ABSTRACT

A device for indicating when the air within a tire is above or below an optimum pressure range, comprising a housing having a bore therein in which a piston is movable. The piston is spring biased toward one end of the bore and is normally held in a medial sealing position by air pressure from within the tire. In such sealing position, a sealing ring on the piston engages a sealing section of the bore to prevent movement of air along the bore; when the air pressure exceeds or falls below the optimum range, the sealing ring moves over a relieved portion of the bore and allows air to move along the latter to actuate a whistle carried by the piston. An electronic device senses the whistle and signals the operator.

5 Claims, 9 Drawing Figures

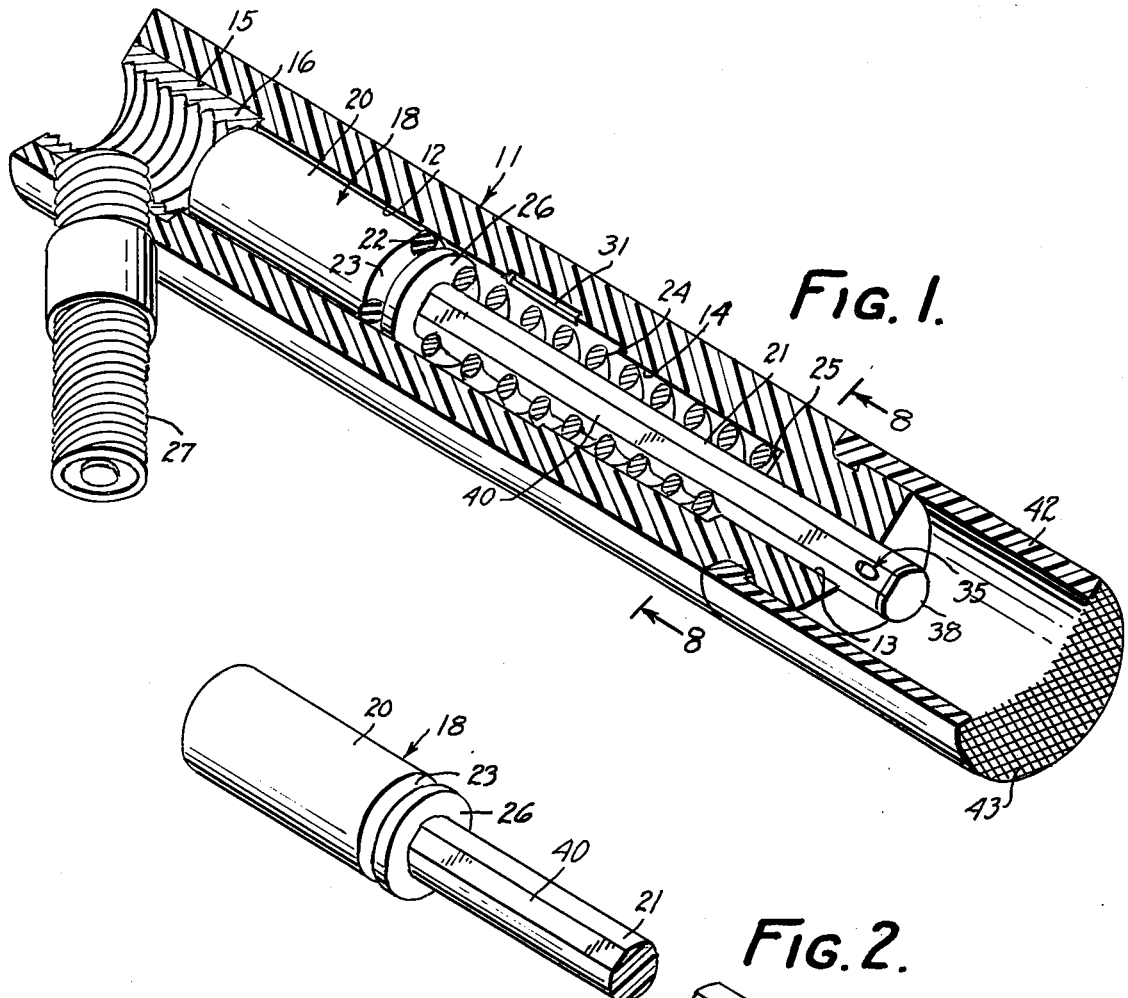
Fig. 1.
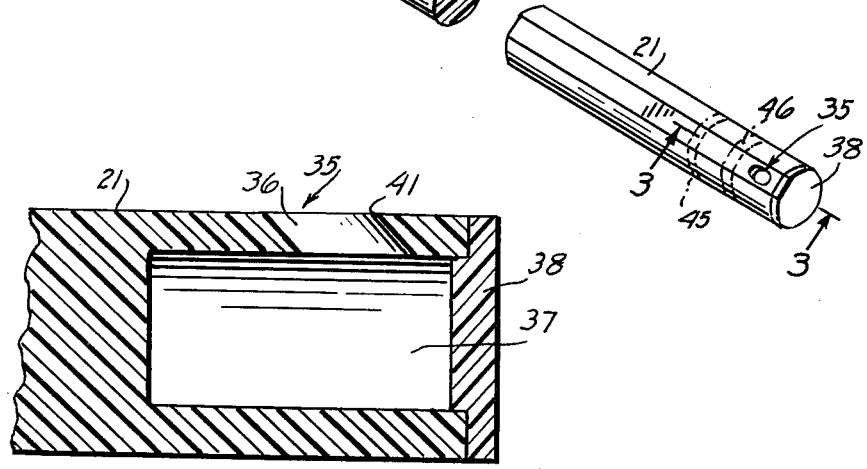
Fig. 2.
Fig. 3.

OVER INFLATION AND UNDER INFLATION INDICATOR FOR TIRES

BACKGROUND OF THE INVENTION

1. Field of the Invention

This invention relates to tire pressure indicating devices and has particular references to devices for signalling when the air pressure within a tire exceeds or drops below an optimum range.

2. Description of the Prior Art

As is well known, over inflation or under inflation of tires, particularly those of heavy vehicles such as trucks and buses, materially reduces the life of such tires and can cause blowouts and even fire damage due to overheating. Also, in cases where dual wheels are employed at different wheel positions, loss of pressure in one tire can cause loss of both tires before the operator can normally become aware of the situation since the excessive load applied to the remaining tire may cause extreme flexure and overheating thereof with the possibility of both tires blowing out or catching fire.

Systems have been developed heretofore for signalling to the operator when the pressure in any of the tires of his vehicle becomes over or under inflated. Such systems generally have not been satisfactory due to complexity of the systems and consequent high cost of manufacture and maintenance as well as unreliability. Such systems also have other drawbacks. For example, certain systems require dismantling of all or part of the signalling device in order to check or correct the tire pressure. Others are capable of signalling an over or under inflation condition only when the vehicle is moving. Again, other systems embody pressure sensing devices having considerable mass and these are therefore affected by centrifugal and vibratory or jarring forces imparted thereto by the wheels as they roll over the ground surface.

SUMMARY OF THE INVENTION

A principal object of the present invention is to overcome the above noted problems found in tire pressure signalling systems of the above type.

Another object is to provide a reliable signalling device for abnormal tire pressures which will operate under all conditions and whether the vehicle is at rest or moving.

Another object is to provide a tire pressure signalling device of the above type which is simple and inexpensive to manufacture.

A further object is to provide a tire pressure signalling device of the above type which is compact and of small mass so as to be unaffected by centrifugal and vibratory forces imparted thereto by the vehicle wheel.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a perspective view, in section, of a sound emitting device for signalling an over or under inflation condition of a tire, and embodying a preferred form of the present invention.

FIG. 2 is a perspective view of the control piston for the device.

FIG. 3 is an enlarged sectional view through the whistle formation on the piston and is taken along the line 3—3 of FIG. 2.

DESCRIPTION OF THE PREFERRED EMBODIMENT

Figure 5:
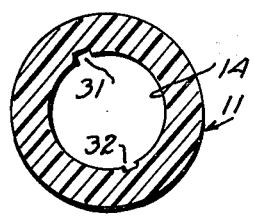
FIG. 5 is a transverse sectional view taken along the line 5—5 of FIG. 4.

Referring to the drawings, the sound emitting device comprises a cylindrical housing 11, preferably of plastic, having a bore 12 extending axially therethrough and forming a reduced diameter section 13 at the outer or right hand end of the housing, an intermediate counterbore section 14 and a relatively large counterbore section 15 at the inner or left hand end of the housing.

Figure 7:
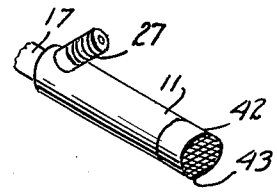
FIG. 7 is a perspective view of the device.

A screw threaded bushing 16, preferably of brass, is securely fitted within the counterbore 15 for mounting the housing onto a tubular stem 17 (FIG. 7) which is suitably secured to the wheel (not shown) of a vehicle. The stem 17 preferably supports the housing 11 with the axis of the latter extending parallel to the axis of the wheel to which it is mounted, and the stem also communicates the interior of the wheel tire with the left hand end of the bore 12.

A piston 18, preferably of plastic, is slideably mounted in the bore 12 and comprises a large diameter section 20 loosely mounted in the intermediate counterbore section 14 and a reduced diameter section 21 slideably fitted within the reduced diameter section 13 of the bore 12. A sliding seal in the form of an elastomeric O-ring 22 is mounted in a peripheral groove 23 formed in the large diameter section 20 of the piston. The O-ring 22 closely and slideably fits within the intermediate counterbore section 14.

A compression spring 24 is fitted over the small diameter piston section 21 and is compressed between the shoulder 25 of the counterbore section 14 and an end face 26 formed by the large diameter section 20 of the piston. The spring 24 is effective, when not reacting against air pressure from the tire, to maintain the piston 18 in its leftmost position shown in FIG. 1 wherein it is limited by engagement with the right hand end of the bushing 16.

A conventional tire valve 27 is inserted at an angle into the inner end of the housing 11 and bushing 16 to communicate with the interior of the tire so that the latter may be tested or filled with air in the usual manner by connecting a supply of air under pressure thereto and without having to remove any part of the device.

Figure 6:
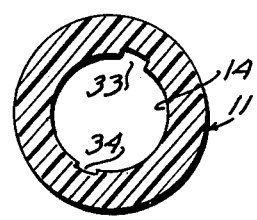
FIG. 6 is a view similar to FIG. 5 but taken along the line 6—6 of FIG. 4.
Figure 4:
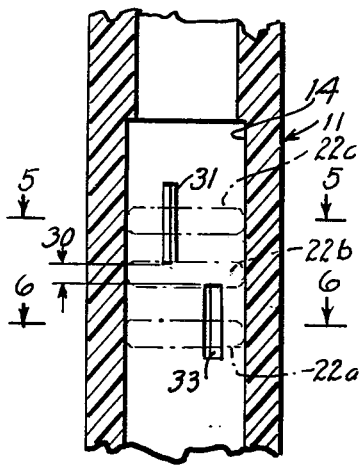
FIG. 4 is a longitudinal sectional view of the mid-portion of the housing per se of the device.

As shown particularly in FIGS. 4 to 6, the intermediate section 14 of bore 12 forms a short sealing section 30 (in which the inner peripheral surface of the bore is continuous) and relieved sections on opposite sides thereof. The outer or right hand relieved section comprises two diametrically opposed narrow elongated slots 31 and 32 extending lengthwise relative to the bore 12. The inner or left hand relieved section is also formed by two diametrically opposed slots 33 and 34 which are approximately twice the width of the slots 31 and are arranged out of alignment with the slots 31, at an angle of approximately 45°.

It should be noted that the grooves 31 and 32 are relatively small in cross section so that the flow rate of air passing therealong under over inflation conditions, as will appear presently, is small. For example, grooves 31 and 32 may each have a cross sectional dimension of 0.030 inches wide and 0.010 inches deep. On the other hand, the grooves 33 and 34 may each have a cross sectional dimension of 0.060 inches wide and 0.010 inches deep.

A whistle generally indicated at 35 is formed on the outer end of the piston section 21 to emit a shrill sound when a stream of air is directed thereacross. As seen in FIG. 3, the whistle comprises a hole 36 extending at an angle of approximately 45° relative to the length of the piston and in communication with a resonating chamber 37. A cap 38 is suitably secured over the end of the piston section 21 to cover the chamber 37.

Figure 8:
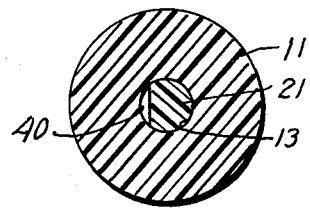
FIG. 8 is a sectional view taken along line 8—8 of FIG. 1.

The piston section 21 has a flat portion 40 (see also FIG. 8) extending therealong and cooperating with the bearing portion 13 of housing 11 to form an air channel effective to direct a stream of air from within the bore 12 so as to impinge the sharp corner 41 to create a whistling sound. Preferably, the chamber 37 is of such length that it will resonate at approximately 6 or 7 KHz since ambient road and other environmental noises are found to be less throughout such frequency range. Therefore, sound emitted by the whistle 35 would be more clearly heard at those frequencies.

Means are provided to prevent contaminants, such as dirt, from entering the device. For this purpose, an open ended cap 42 is non-removably secured to the outer end of the housing 11 and is provided with a fine mesh screen 43 which permits passage of air and sound therethrough but which filters out any dust, dirt, water, etc.

Describing now the operation of the device, when the tire is completely deflated, the spring 24 will force the piston 18 to the inner extreme of its travel as shown in FIG. 1. In such case, the O-ring 22 will assume a position shown by dot-dash lines 22a of FIG. 4. As air pressure is applied through valve 27 to inflate the tire, the air will react against the piston 18, advancing the same outwardly against the action of spring 24. During this process, a small amount of air will pass into the counterbore section 14, between O-ring 22 and grooves 33,34 and then through the channel created by the flat portion 40 to actuate the whistle 35. However, the greater volume of the incoming air will be directed into the tire and when the air within the tire reaches a minimum allowable pressure of, say 70 lbs. per square inch, the piston will have reached a mid point wherein the O-ring 22 engages the sealing portion 30 of the bore 12 to completely seal the bore against air movement therealong and the whistling action will stop, indicating that the tire is properly inflated.

Considering that tires of heavy vehicles, such as trucks, may generally be safely maintained at air pressures within a range of 70 lbs. per square inch to 130 lbs. per square inch, the sealing portion 30 is made of such an axial length that the O-ring 22 maintains sealing engagement with the bore through such range. Thus, when the air pressure is approximately midway between the limits of such range, i.e. 100 lbs. per square inch, the O-ring 22 will assume a position depicted at 22b. When the tire pressure increases above 130 lbs. per square inch, the piston 18 will move outward causing the O-ring 22 to move toward its position 22c, uncovering grooves 31 and 32 so that air will again move along the bore to actuate the whistle 35.

Accordingly, when the tire becomes under inflated to less than 70 lbs. per square inch or becomes over inflated to more than 130 lbs. per square inch, the whistle will be actuated.

Because of the low flow rate of the air through grooves 33 and 34, any under inflated condition will be signalled by the whistle 35 over a relatively long time without causing material deflation of the tire.

Means may also be provided to visually indicate any over or under inflated condition of the tire. For this purpose, the cap 42 may be made of transparent plastic and two colored bands shown by dot-dash lines 45 and 46 may be formed along the piston section 21. Thus, the position of the bands relative to the outer end of the housing 11 will visually indicate the inflated condition.

It should be noted that the device of the present invention can be used on passenger and other vehicles as well. Also, alternatively, the housing 11 could, with obvious modification, be suitably secured directly to the rim of the wheel in the case of tubeless tires or to the inner tube in the case of tube tires.

Figure 9:
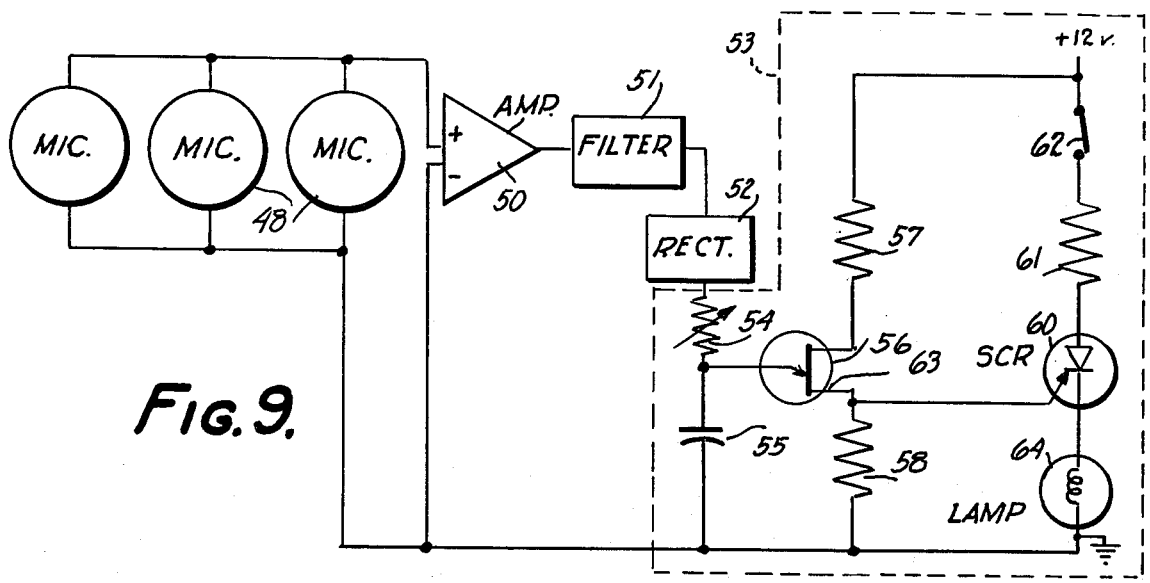
FIG. 9 is a schematic circuit diagram of an electronic circuit for sensing the sound emitting device and for transmitting a signal to the vehicle operator when the device is activated.

In cases where the sound emitting devices are applied to the tires of relatively large trucks, etc., in which the wheels may be spaced a considerable distance from the operator's cab, an electronic signalling system is preferably provided to signal any abnormal tire condition as indicated by any of the sound emitting devices. Such a system is shown in FIG. 9 and comprises one or more microphones 48 mounted in desirable locations on the vehicle and connected in parallel with each other and in circuit with an amplifier 50, a conventional band pass filter 51, rectifier 52, and control 53, the latter being effective to energize a lamp 64 or other warning devices within the operator's cab.

The microphone or microphones 48 are preferably constructed to pick up sounds predominantly within the 6 to 7 KHz range and the filter 51 further restricts the signals passed therethrough to this region since, as noted before, the whistle 35 is constructed to emit a whistling sound predominantely in this region.

Although any suitable control circuit 53 may be employed, that shown for illustration comprises a rheostat 54 and capacitor 55 connected in series and connected at their juncture to the emitter of a uni-junction transistor 56 whose bases are connected through resistors 57 and 58 across a direct current power source.

The lamp 64 is connected in series with an SCR 60, load resistor 61 and normally closed switch 62, across the power source, the SCR being controlled by the base 63 of the transistor 56.

Accordingly, after the whistling sound has been sensed by the microphone or microphones 48 and the circuit of FIG. 9 activated to light the warning lamp 64, the operator may extinguish the same by opening the switch 62 to open the SCR 60.

It will be obvious to those skilled in the art that many variations can be made in the exact structure shown without departing from the spirit of this invention.

I claim:

1. A device for indicating an abnormal air pressure within a tire comprising,
    a housing having a bore therein, means for mounting said housing with one end of said bore in communication with the interior of said tire, the opposite end of said bore being in communication with the atmosphere, said bore in the housing having a sealing section and a relieved section, a piston in said bore, said piston having a portion extending beyond said opposite end of said bore, sealing means on said piston, said piston being acted on by air from said tire to urge said piston toward said opposite end of said bore, biasing means for urging said piston toward said one end of said bore, said air overcoming said biasing means to cause said piston to locate said sealing means in engagement with said sealing section when said air is at an optimum pressure whereby to prevent movement of said air along said bore and between said piston and said bore, said biasing means overcoming said air to locate said sealing means over said relieved section when said air is at any of different abnormal pressures whereby to permit movement of said air along said bore and between said piston and said bore, and means responsive to movement of said air along said bore for producing an indicating signal comprising whistle means on the extending portion of said piston, said device having a channel formed by a flat portion of the piston coacting with a portion of the housing at the top to convey air to said whistle means to impinge upon the whistle means and thereby produce said indicating signal.

2. A device for indicating when the air pressure within a tire is above or below an optimum pressure comprising a housing having a bore therein, means for mounting said housing with one end of said bore in communication with the interior of said tire, the opposite end of said bore being in communication with the atmosphere, said bore in the housing having a sealing section and relieved sections at opposite ends of said sealing section, a piston in said bore, said piston having a portion extending beyond said opposite end of said bore, sealing means on said piston, said piston being acted on by air from said tire to urge said piston toward said opposite end of said bore, spring means for urging said piston toward said one end of said bore, said air overcoming said spring means to locate said sealing means in sealing engagement with said sealing section when said air is at said optimum pressure whereby to prevent movement of said air along said bore and between said piston and said bore, said spring means overcoming said air to locate said sealing means over a first one of said relieved sections when said air is at any of different pressures below said optimum pressure whereby to permit said air to move along said bore and between said piston and said bore, said air overcoming said spring means to locate said sealing means over the second of said relieved sections when said air pressure is at any of different values above said optimum pressure whereby to permit said air to move along said bore and between said piston and said bore, and means responsive to movement of said air along said bore for producing an indicating signal comprising whistle means located on said extending portion of said piston, said device having a channel formed by a flat portion of the piston coacting with a portion of the housing at the top to convey air to said whistle means to impinge upon the whistle means and thereby produce said indicating signal.

3. A device according to claim 2 (amended) wherein said relieved sections comprise grooves in the surface of said bore and extending parallel to the length of said bore.

4. A device as defined in claim 2 (amended) comprising visible indicating means on said extending portion of said piston for indicating when said tire pressure is above or below said optimum pressure.

5. A device as defined in claim 2 (amended) wherein said relieved sections comprise grooves in the surface of said bore and extending lengthwise of said bore, the said groove comprising said first relieved section having a greater cross sectional area than the cross sectional area of said groove comprising said second relieved section.

* * * * *

UNITED STATES PATENT AND TRADEMARK OFFICE
CERTIFICATE OF CORRECTION

PATENT NO. : 4,066,033
DATED : January 3, 1978
INVENTOR(S) : Robert A. Perry and Placido Martos It is certified that error appears in the above-identified patent and that said Letters Patent are hereby corrected as shown below:

Column 6, line 33, cancel "(amended)"; line 37, cancel "(amended)"; and, line 42, cancel "(amended)".

Signed and Sealed this

Fourteenth Day of November 1978

[SEAL]

Attest:

RUTH C. MASON
Attesting Officer

DONALD W. BANNER
Commissioner of Patents and Trademarks